United States Patent
Schneider

[15] 3,664,371
[45] May 23, 1972

[54] RESILIENT POPPET VALVE

[72] Inventor: William E. Schneider, Annapolis, Md.

[73] Assignee: The United States of America as represented by the Secretary of the Navy

[22] Filed: Oct. 23, 1970

[21] Appl. No.: 83,571

[52] U.S. Cl................137/516.29, 137/525, 137/543.19
[51] Int. Cl..........................................F16k 15/00
[58] Field of Search..............137/516.25, 516.27, 516.29, 137/519.5, 525, 539, 539.5, 543.19, DIG. 3; 251/332, 333, 334

[56] References Cited

UNITED STATES PATENTS

| | | | |
|---|---|---|---|
| 3,457,949 | 7/1969 | Coulter | 137/516.27 X |
| 3,113,587 | 12/1963 | Hendley | 137/519.5 |
| 2,676,782 | 4/1954 | Bostock et al. | 137/543.19 X |
| 3,101,739 | 8/1963 | Pribonic | 137/539.5 X |
| 3,465,786 | 9/1969 | Spisak | 137/516.27 |
| 3,536,094 | 10/1970 | Manley | 251/333 X |

Primary Examiner—Robert G. Nilson
Assistant Examiner—David J. Zobkiw
Attorney—R. S. Sciascia and Q. E. Hodges

[57] ABSTRACT

A lightweight poppet valve having a resilient poppet in which the radius of the spherical contact surface is slightly larger than the radius of the spherical contact surface of the metal valve seat such that as the pressure behind the poppet increases the poppet gradually assumes the shape of the valve seat to form a tight seal.

3 Claims, 3 Drawing Figures

PATENTED MAY 23 1972 3,664,371

INVENTOR.
WILLIAM E. SCHNEIDER
BY *O. C. Hodges*

ATTORNEY

RESILIENT POPPET VALVE

The invention described herein may be manufactured and used by or for the Government of the United States of America for Governmental purposes without the payment of any royalties thereon or therefor.

BACKGROUND OF THE INVENTION

Prior to the use of a lightweight resilient, plastic poppet, metal poppets were used in this type of valve. The speed at which the valve could open and close is a function of the weight of the moving poppet. If the valve is to operate efficiently, the movable poppet must require as small a force as possible to cause it to move. Also, if the valve is to open (the poppet move off its seat) at low inlet pressures the valve spring must only exert a small force upon the poppet. Thus the fluid force which causes the valve to open and the spring force which causes it to close again will be small. Stainless steel has previously been used as the poppet material. It is approximately four times heavier than the plastic poppet. Its inertia forces are then four times as great. The inertia force is the force required to speed up or slow down an object of a given weight. The poppet must be accelerated from its closed position to its open position by the force of the incoming water and accelerated from its open position to its closed position by the valve spring. A plastic poppet could do this four times faster than the much heavier stainless steel poppet with the same amount of force applied.

When a spherical shaped metal poppet is in contact with its metal valve seat, water could leak through at the point of contact. An o-ring seal was required to make a leak tight seal. If pressure is increased on the outlet side of the valve the rubber O-ring is forced into any space which may exist between the poppet and the valve seal. If the metal poppet and metal valve seat do not match each other exactly, there will be unfavorable stress distribution in the poppet. The same situation will arise if sand, dirt, or any other hard particles get caught between the poppet and the valve seat. This type of interference between the poppet and the valve seat may be serious enough to prevent proper sealing and cause the valve to leak. These hard particles will also cause dents and other deformations in both the poppet and valve seat and may in time prevent proper operation of the valve.

SUMMARY OF THE INVENTION

The general purpose of this invention is to provide a valve which can be used in high speed, high pressure, seawater pumps. It is capable of operating at up to 60 cps and against a pressure of 10,000 psi with minimum leakage. In addition, the valve is highly resistant to the corrosive and abrasive fluids such as silt laden seawater which may flow through it.

To attain this, the invention utilizes resilient plastic materials to permit more effective sealing and higher speeds of operation then would be possible with similar parts made of metal. The resilient poppet moves in such a way as to cover and uncover flow passages in the valve body. A spherical valve seat in the valve body is used to contain the movable poppet when it is in its closed position. A rubber ring of round cross-section or O-ring is positioned in the valve in such a way as to act as an additional means of sealing when the poppet is firmly in its seat. A poppet return spring of low force is used to hold the poppet against the seat until the fixed pressure is built up on the inlet side of the valve to cause the poppet to move off its seat. This spring also returns the poppet to the seat when the inlet pressure is removed. A valve cap is used to position and contain the spring. It also provides a lip which prevents the O-ring seal from being washed out of position as water rushes through the valve.

OBJECT OF THE INVENTION

The general purpose of this invention is to provide a valve having a resilient plastic poppet requiring less force to accelerate or for the same forces capable of operating at much greater speed than a poppet made of higher density material.

It is another object of the invention to provide a valve having a poppet made of resilient material which will yield and assume the shape of the rigid metal valve seat. The higher the pressure becomes the more the poppet yields to fit the shape of the valve seat and the tighter it will seal.

Still another object of the instant invention is to provide a valve in which hard particles of sand, shell or any other contaminate will not cause denting or chiping in the valve seat.

DESCRIPTION OF THE PREFERRED EMBODIMENT

Figure 1:
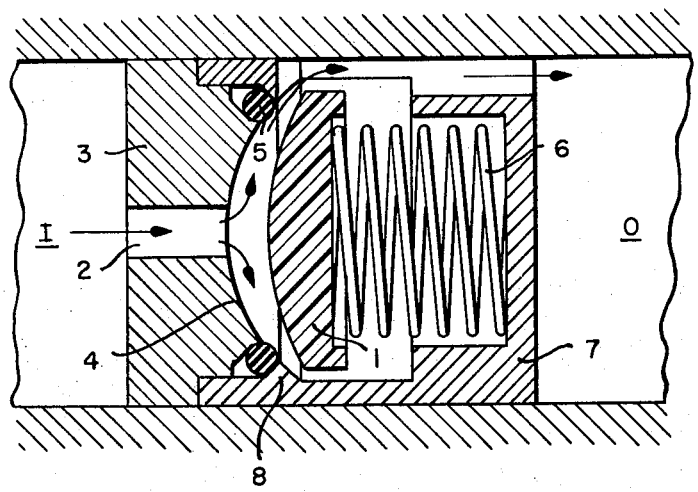
FIG. 1 is a view, completely in section, of the valve in the open position.

With continued reference to the drawing, FIG. 1 shows, completely in section, the complete valve structure. A resilient plastic poppet 1 is moved to cover or uncover a flow passage 2 in the valve body 3. When the poppet is not in contact with the valve seat the valve is opened and fluid can flow through the inlet side I of the valve through to the outlet side O. When the poppet is in contact with the valve seat fluid is prevented from returning into the inlet side of the valve.

The radius of the spherical contact surface from the poppet 1 is slightly larger than the radius of the spherical contact surface of the valve seat 4.

Figure 2:
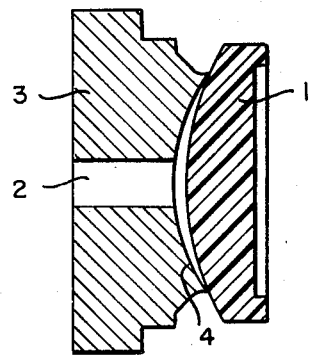
FIG. 2 is a section view showing the resilient poppet positioned in contact with the valve body.
Figure 3:
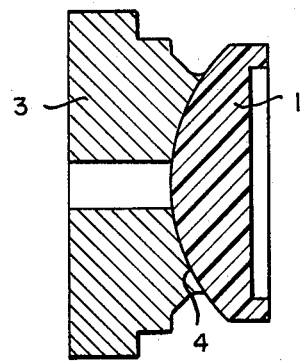
FIG. 3 is a view of the resilient plastic poppet after high pressure has been applied to the poppet to seat the poppet.

FIG. 2 shows that when the poppet is brought into contact with the valve seat there would only be a very small ring of contact at the outer edge of the valve seat 4. If a pressure were built up on the outlet side O of the valve it would tend to force the resilient poppet into the rigid metal valve seat 4. At some pressure, depending upon the resiliency of the plastic used and the difference in the spherical radii of the poppet and valve seat, the poppet would assume the shape of the seat and form a tight seal as shown in FIG. 3. It is considered merely a design detail that the poppet has sufficient rigidity to seal without being forced through the opening.

This valve also utilizes a rubber O-ring seal 5 as shown in FIG. 1 to provide for more complete sealing at pressures to low to deform the poppet into the shape of the valve seat. The O-ring is positioned such that the fluid pressure will tend to force it into any voids created by a mismatch of the poppet and valve seat. A retaining lip 8 is provided to maintain the O-ring seal in its proper position. The lip may be incorporated into the valve cap 7 which is also used to position the poppet return spring 6. This spring is used to return the poppet to contact the valve seat after the fluid pressure tending to open the valve has been removed.

Even if the valve unit should be subjected to high temperatures which might cause deformation in the resilient poppet, upon application of pressure thereto as above described, the resilient poppet and the valve seat will be pressed rightly together for effective sealing action and the greater the pressure the more dependable the seal.

Since the resilient poppet is deformable to provide a dependable seal as above noted, extremely close tolerance in the manufacture of the poppet and the valve seat is not required, thereby reducing the cost of the unit. Also, slight wear due to fluid flow will be compensated by reason of the deflection of the resilient poppet.

It is understood that the invention is not limited to the exact details of construction shown and described, for obvious modifications will occur to persons skilled in the art. It is therefore to be understood that within the scope of the appended claims the invention may be practiced otherwise than as specifically described.

What is claimed:

1. A poppet valve assembly comprising:
    a valve seat having a flow passage therethrough, said valve seat having a concave spherical contact surface; and a resilient poppet adapted to adjustably seat against said valve seat to prevent fluid from flowing from said flow passage, said resilient poppet having a convex spherical contact surface, the radius of said convex spherical contact surface being greater than the radius of said concave spherical contact surface at initial contact of the resilient poppet with the valve seat, and wherein subsequently the radius of said convex spherical contact surface becomes the same as the radius of said concave spherical contact surface with further sealing contact of the resilient poppet with the valve seat whereby the seating force on the poppet is maximized.

2. The apparatus of claim 1 wherein said resilient poppet is made completely of plastic.

3. The apparatus of claim 1 wherein O-rings are attached to said valve seat to contact said resilient poppet to supplement fluid sealing.

* * * * *